United States Patent
Elkins et al.

(10) Patent No.: US 9,310,802 B1
(45) Date of Patent: Apr. 12, 2016

(54) MULTI-OPERATOR, MULTI-ROBOT CONTROL SYSTEM WITH AUTOMATIC VEHICLE SELECTION

(71) Applicant: Jaybridge Robotics, Inc., Cambridge, MA (US)

(72) Inventors: Michael Elkins, Cambridge, MA (US); Todd Rowell, Cambridge, MA (US); Bradly Martin, Cambridge, MA (US); Grant Gould, Cambridge, MA (US)

(73) Assignee: Jaybridge Robotics, Inc., Cambridge, MA (US)

( * ) Notice: Subject to any disclaimer, the term of this patent is extended or adjusted under 35 U.S.C. 154(b) by 0 days.

(21) Appl. No.: 14/723,692

(22) Filed: May 28, 2015

Related U.S. Application Data

(60) Provisional application No. 62/112,543, filed on Feb. 5, 2015.

(51) Int. Cl.
*G06F 7/00* (2006.01)
*G05D 1/00* (2006.01)

(52) U.S. Cl.
CPC .............. *G05D 1/0027* (2013.01); *Y10S 901/01* (2013.01)

(58) Field of Classification Search
CPC ....... B25J 9/1697; F41H 7/005; G06N 3/008; A01B 79/005
USPC ............. 700/245, 248, 259, 264; 701/2, 3, 23
See application file for complete search history.

(56) References Cited

U.S. PATENT DOCUMENTS

| | | | | |
|---|---|---|---|---|
| 5,825,981 | A * | 10/1998 | Matsuda | 700/248 |
| 7,720,572 | B2 * | 5/2010 | Ziegler et al. | 700/245 |
| 8,073,564 | B2 | 12/2011 | Bruemmer et al. | |
| 8,935,006 | B2 * | 1/2015 | Vu et al. | 700/264 |
| 9,031,714 | B1 * | 5/2015 | Everett et al. | 701/2 |
| 9,085,080 | B2 * | 7/2015 | Mian | |
| 2004/0098167 | A1 * | 5/2004 | Yi et al. | 700/245 |
| 2008/0091300 | A1 * | 4/2008 | Fletcher et al. | 700/245 |
| 2011/0054684 | A1 | 3/2011 | Seo et al. | |
| 2012/0303160 | A1 * | 11/2012 | Ziegler et al. | 700/259 |
| 2013/0060378 | A1 * | 3/2013 | Schmitz et al. | 700/245 |
| 2013/0123980 | A1 | 5/2013 | Seo | |
| 2014/0031977 | A1 * | 1/2014 | Goldenberg et al. | 700/245 |
| 2014/0039680 | A1 * | 2/2014 | Angle et al. | 700/259 |
| 2014/0303814 | A1 * | 10/2014 | Burema et al. | 701/3 |
| 2015/0073594 | A1 * | 3/2015 | Trujillo et al. | 700/248 |

OTHER PUBLICATIONS

Steinfeld, Interface Lessons for Fully and Semi-Autonomous Mobile Robots, 2004, IEEE, p. 2752-2757.*

* cited by examiner

*Primary Examiner* — McDieunel Marc
(74) *Attorney, Agent, or Firm* — Chetlin IP, P.C.

(57) ABSTRACT

A method of controlling a plurality of robotic vehicles may involve the steps of: Determining a state of each of the plurality of robotic vehicles; assigning a robotic vehicle to an operator in response to a Binding command from the operator; allowing the operator to command the assigned robotic vehicle to perform a mission; and releasing the assigned robotic vehicle in response to an Unbinding command from the operator.

20 Claims, 9 Drawing Sheets

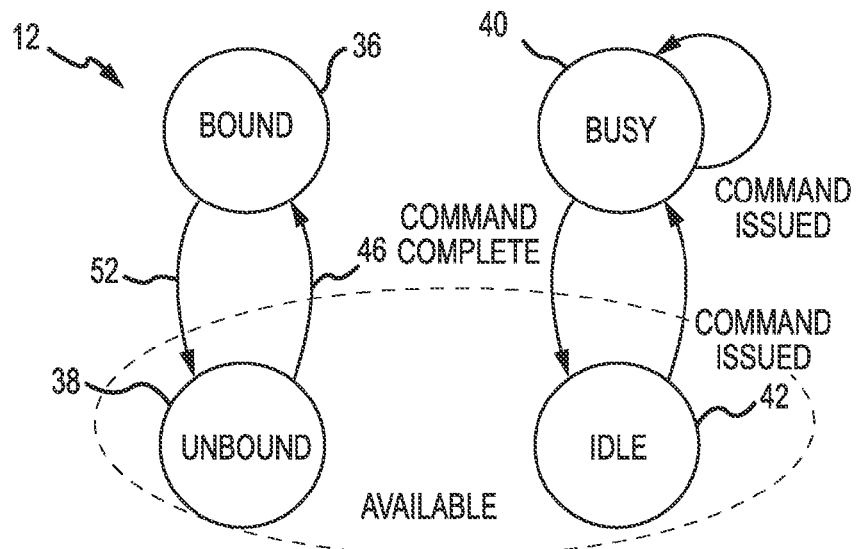
FIG.3
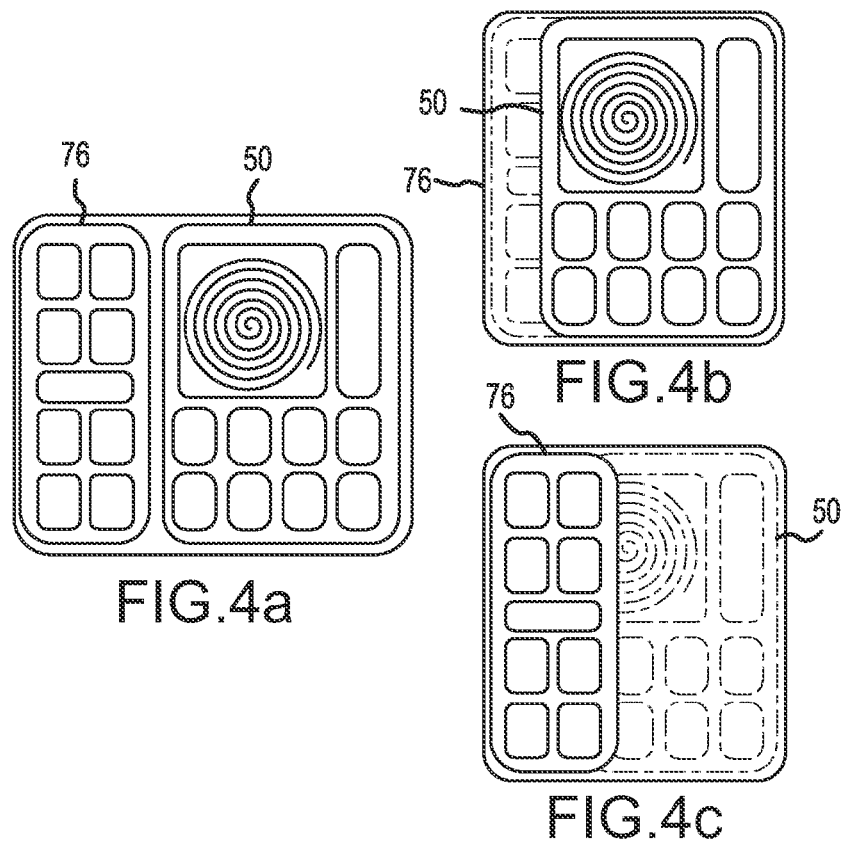
FIG.4a
FIG.4b
FIG.4c

MULTI-OPERATOR, MULTI-ROBOT CONTROL SYSTEM WITH AUTOMATIC VEHICLE SELECTION

CROSS-REFERENCE TO RELATED APPLICATION

This application claims the benefit of U.S. Provisional Patent Application No. 62/112,543, filed on Feb. 5, 2015, which is hereby incorporated herein by reference for all that it discloses.

TECHNICAL FIELD

This invention relates to machine control systems in general and more specifically to systems for coordinating and controlling a fleet of robots.

BACKGROUND

Various kinds of robots and robotic vehicles are well-known in the art and have been used for decades to perform a wide variety of tasks. As robots and robotic vehicles become more widely used and sophisticated, there is a continuing need for robot control systems that allow the robots or robotic vehicles to be more effectively and efficiently controlled by system operators. For example, one type of robot control system allows a single operator to control multiple robots. However, such systems are limited in that it may be difficult for a single operator to control a fleet of robotic vehicles that is greater than a certain size. While robot control systems have also been developed that permit multiple operators to control a fleet of robots, such systems can still create difficulties and confusion as to which operators are controlling specific robotic vehicles.

SUMMARY OF THE INVENTION

One embodiment of a method of controlling a plurality of robotic vehicles may involve the steps of: Determining a state of each of the plurality of robotic vehicles; assigning a robotic vehicle to an operator in response to a Binding command from the operator; allowing the operator to command the assigned robotic vehicle to perform a mission; and releasing the assigned robotic vehicle in response to an Unbinding command from the operator.

A system for controlling a plurality of robotic vehicles according to the teachings provided herein may involve an autonomy module and an interface communication module operatively associated with the autonomy module. A graphical user interface operatively associated with the interface communication module allows an operator to interface with the system. A short range network operatively associated with the interface communication module and at least one of the plurality of robotic vehicles allows for the exchange of information, data, and commands. A long range network operatively associated with the interface communication module and with each of the plurality of robotic vehicles provides an additional mechanism for exchanging information, data, and commands. A central server operatively associated with the long range network controls the operation of the long range network, assigns identities to participating operators and robotic vehicles, and maintains a catalog of participating operators and vehicles.

BRIEF DESCRIPTION OF THE DRAWINGS

Illustrative and presently preferred exemplary embodiments of the invention are shown in the drawings in which:

FIG. 3 is a schematic representation of robotic vehicle control states and the allowed transitions between states;

FIGS. 4(*a-c*) are pictorial representations of one embodiment of a graphical user interface showing different configurations of a primary control panel and a fleet status panel;

FIG. 5(*b*) is a pictorial representation of a primary control panel for an operator that is bound to a robotic vehicle;

FIG. 7(*b*) is a pictorial representation of a secondary control panel for a bound operator and an available robotic vehicle; and FIG. 7(*c*) is a pictorial representation of a secondary control panel for an unbound operator and a bound-elsewhere robotic vehicle.

DETAILED DESCRIPTION OF THE PREFERRED EMBODIMENTS

Figure 1:
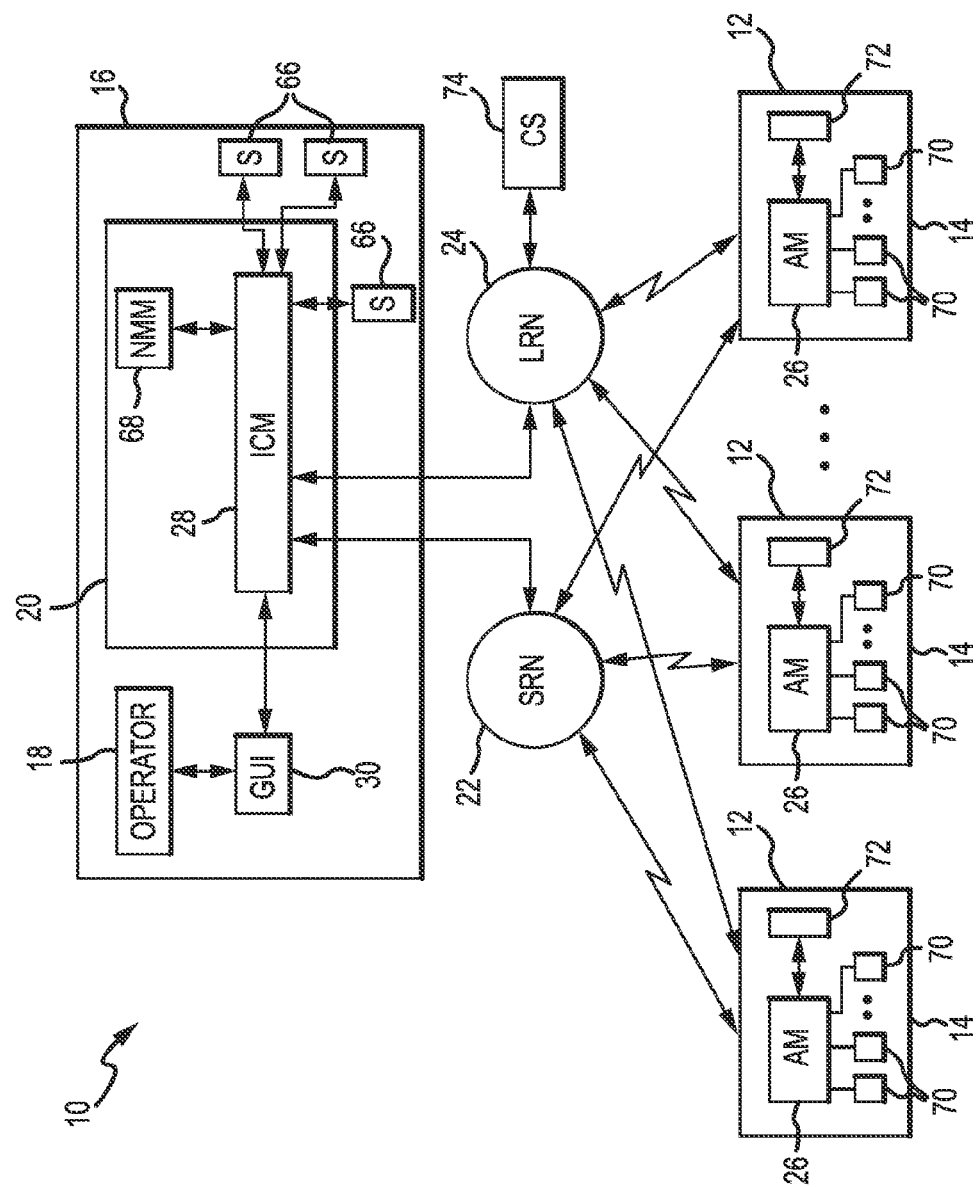
FIG. 1 is a schematic representation of one embodiment of a system for controlling a plurality of robotic vehicles according to the teachings provided herein.

One embodiment of a system 10 for controlling a plurality of robots or robotic vehicles 12 is illustrated in FIG. 1. The system 10 is shown and described herein as it could be used in an agricultural application wherein the robots or robotic vehicles 12 comprise grain carts 14 suitable for collecting grain harvested by one or more combines 16 working in a field. Alternatively, the system 10 may be used in other applications as well. In the particular embodiment shown and described herein, the system 10 allows one or more operators 18 (e.g., combine drivers) to easily and efficiently control the robotic vehicles 12, e.g., grain carts 14, during a grain harvesting operation. For example, in response to appropriate mission commands (e.g., from one or more operators 18), the grain carts 14 may autonomously navigate the grain field and position themselves to receive grain harvested by the combine 16. After a grain cart 14 is filled with grain, it may then proceed to a collection station, where the loaded grain cart 14 may be emptied. Thereafter, the grain cart 14 may return to the combine 16 for another load.

In the particular embodiment shown and described herein, the system 10 may comprise at least one autonomy module 20, a short range network 22, and a long range network 24. The autonomy module 20 may be operatively associated with combine 16, although other arrangements are possible. Each robotic vehicle 12, e.g., grain cart 14, also may be provided with an autonomy module 26. The autonomy module 26 in each robotic vehicle 12 may be substantially identical to autonomy module 20, although it need not be. The system 10 may also comprise an interface communications module 28. Interface communications module 28 may be operatively associated with autonomy module 20 and may be configured to manage or organize communications and data transfer between the autonomy module 20 and the various robots 12 via the short- and long-range networks 22 and 24. The system 10 may also comprise a graphical user interface or GUI 30 to allow the operator 18 to interact with the system 10. In one embodiment, the GUI 30 is operatively associated with the interface communications module 28.

Figure 2:
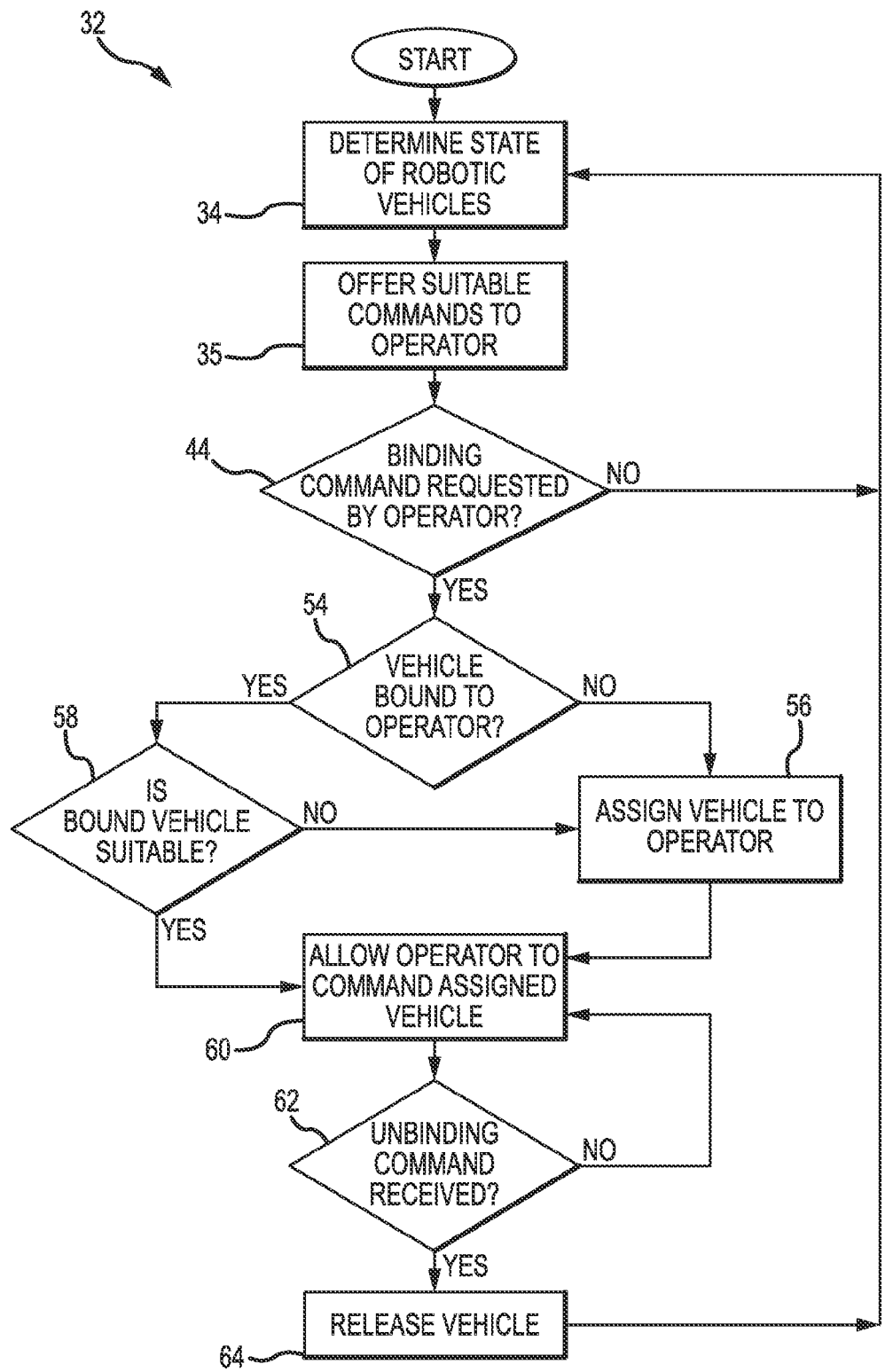
FIG. 2 is a flow chart representation of one embodiment of a method of controlling a plurality of robotic vehicles according to the teachings provided herein.

With reference now primarily to FIGS. 2 and 3, the system 10 may be configured to operate in accordance with a method 32 to control the various robotic vehicles 12 and allow them to be directed by one or more of the operators 18. A first step 34 in method 32 may involve determining the state of the various robotic vehicles 12 comprising the fleet. In the particular embodiment shown and described herein, each robotic vehicle 12 may be in at least one of a "Bound" state 36, an "Unbound" state 38, a "Busy" state 40, and an "Idle" state 42. See FIG. 3. Briefly, a robotic vehicle 12 is in a Bound state 36 if it is currently assigned to an operator 18. A robotic vehicle 12 is in an Unbound state 38 if it is not currently assigned to an operator 18. A robotic vehicle 12 is in a Busy state 40 if it is currently performing a mission or command, and is in an Idle state 42 if the mission or command has been completed. Robotic vehicles 12 that are in both the Unbound and Idle states 38 and 42 are available for assignment, that is they may be bound to an operator 18. Robotic vehicles that are in other states are not available for assignment.

Figure 5A:
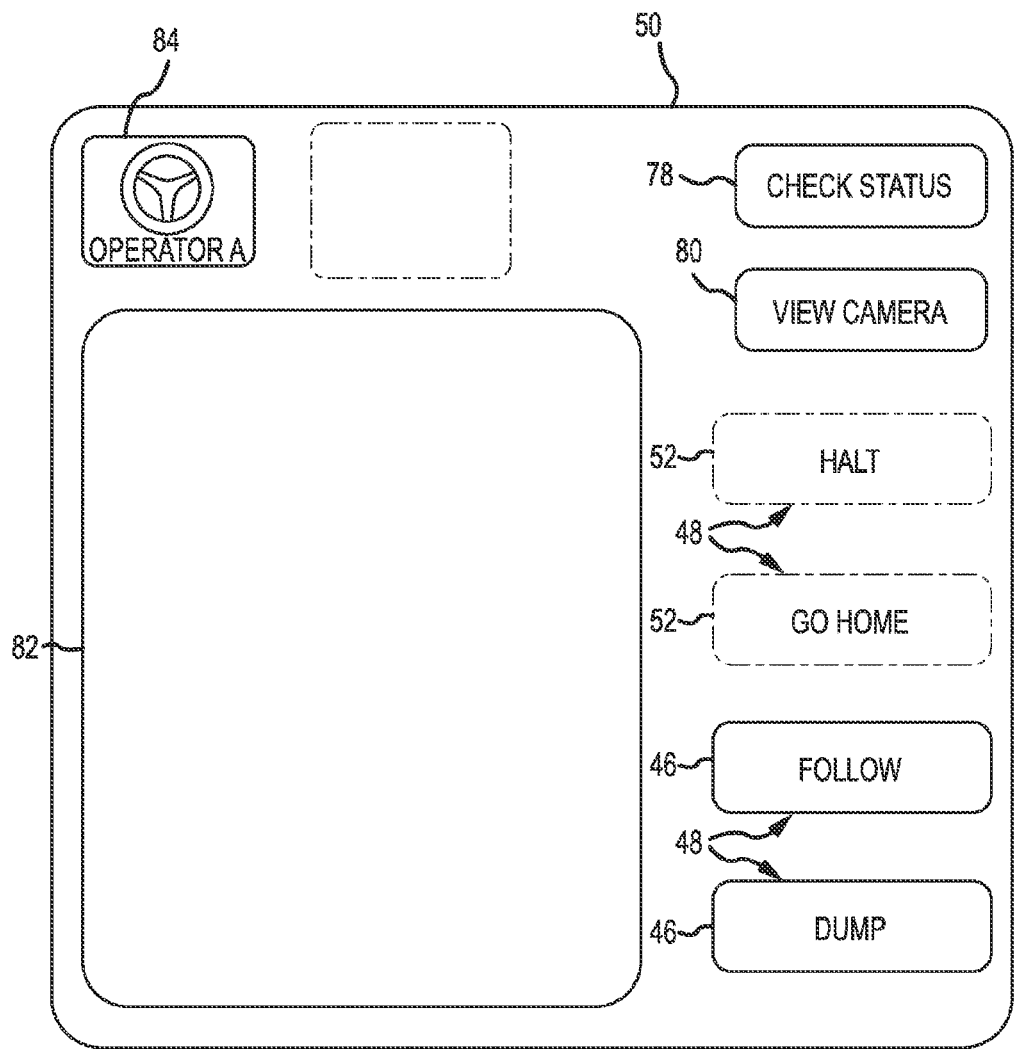
FIG. 5(*a*) is a pictorial representation of a primary control panel for an operator that is not bound to any robotic vehicle.

Method 32 may also involve a step 35 of offering suitable commands 48 to an operator 18. As will be described in greater detail below, the offered commands 48 may be based on the state of the robotic vehicles 12. The commands 48 may be provided on a primary control panel 50 which may be displayed on GUI 30. See, for example, FIGS. 5(a) and (b). As will be described in further detail below, in one embodiment the commands 48 may comprise "Halt," "Go Home," "Follow," and "Dump" commands. Alternatively, of course, other or additional commands may be provided.

The next step 44 of method 32 may involve determining whether a Binding command 46 has been requested by the operator 18 and/or received by the system 10. A Binding command 46 may be requested or initiated by an operator 18 by activating an appropriate command icon presented on primary control panel 50. Binding commands 46 may comprise the Follow and Dump commands 48, which may be provided on the primary control panel 50 as respective Follow and Dump command icons. See, for example, FIGS. 5(a) and (b). The commands 48 may also comprise Unbinding commands 52. In the particular embodiment shown and described herein, Unbinding commands 52 may comprise the Halt and Go Home commands 48, which may be displayed on primary control panel 50 as respective Halt and Go Home command icons.

If no Binding command 46 has been issued or requested by the operator 18 (and received by the system 10), method 32 continues to determine (i.e., update) the state of the various robotic vehicles 12 by repeating step 34. If a Binding command 46 has been issued by the operator 18 (e.g., a Follow or Dump command 48), then method 32 then proceeds to step 54. Step 54 involves determining whether a robotic vehicle 12 is currently bound to the operator 18 that issued the Binding command 46. If no robotic vehicle 12 is currently bound to the requesting operator 18, the method 32 will assign a robotic vehicle 12 to the requesting operator 18 at step 56.

In one embodiment, the method 32 will assign to the requesting operator 18 an available robotic vehicle 12, e.g., a robotic vehicle 12 that is in both an Unbound state and an Idle state. See FIG. 3. Further, and as also will be described in greater detail below, the method 32 may assign to the requesting operator 18 an available robotic vehicle 12 that is in a position or location such that it may perform the requested mission as rapidly or efficiently as possible, although this is not required.

If a robotic vehicle 12 is already bound to the requesting operator 18, e.g., as determined during step 54, then method 32 may proceed to step 58 to determine whether the bound vehicle 12 is suitable for the requested command 48. If for some reason the bound vehicle 12 is not suitable for performing the requested command 48, then method 32 may proceed to step 56 and assign a new vehicle 12 to the requesting operator 18. If so, the operator 18 may unbind the currently bound, but unsuitable, vehicle 12 by selecting an Unbinding command for that particular vehicle 12, although this is not required. In one embodiment, the system 10 will not automatically unbind a vehicle 12 from an operator 18. The unbinding must be commanded by the operator 18.

In any event, method 32 may then proceed to step 60 in which the operator 18 will be allowed to command the assigned or bound vehicle 12. The system 10 may allow the assigned operator 18 to continue to issue additional commands 48 to the assigned or bound vehicle 12 until such time as it receives an Unbinding command 52 at step 62. During this time, the method 32 will continue to allow the operator 18 to assign additional commands 48 to the bound vehicle 12. Once an Unbinding command 52 is received, e.g., when the operator 18 selects either the Halt or Go Home command 48, method 32 may then release the vehicle 12 at step 64.

The operation of the system 10 may be better understood by considering an exemplary application. Consider, for example, an embodiment wherein the system 10 is configured for use in an agricultural application and wherein the robots or robotic vehicles 12 comprise grain carts 14 suitable for collecting grain harvested by one or more combines 16 working in a field. An initial condition may involve a situation wherein no robotic vehicle 12 (e.g., grain cart 14) is bound to a combine operator 18. When ready to begin a harvesting operation, the combine operator 18 may use the graphical user interface or GUI 30 to select the Follow command icon provided on the primary control panel 50. As mentioned, the GUI 30 may be provided in the cab of the combine 16. Upon receiving the Follow command 48, which is a Binding command 46, the system 10 will execute step 56 and assign or bind to the operator 18 a vehicle 12 (e.g., a grain cart 14). Thereafter, the assigned or bound vehicle 12 will autonomously move into the appropriate position (e.g., a following position) adjacent the combine 16. At this point it should be noted that the grain cart 14 may perform its mission entirely autonomously, i.e., without further need of commands or instructions from the combine operator 18.

The operator 18 may then issue another command (e.g., a Dump command 48) to the grain cart 14. In the particular embodiment shown and described herein, the issuance of the Dump command 48 will cause the grain cart 14 to autonomously move to a different position relative to the combine 16 to allow the grain cart 14 to receive grain discharged by the combine 16. The grain cart 14 will maintain this position until it is commanded to do something else.

When the grain cart 14 is fully loaded, the operator 18 may use the GUI 30 to activate the Go Home command 48. In response, the system 10 will command the loaded grain cart 14 to navigate to the dumping or discharge area. Again, the loaded grain cart 14 may perform this mission entirely autonomously, i.e., without further input from operator 18. Further, because the Go Home command 48 is an Unbinding command 52, the system 10 will unbind the loaded grain cart 14 from the operator 18. The system 10 may then update the state of the loaded grain cart to Unbound and Busy. That is, while the loaded grain cart 14 has been released or unbound from the particular operator, it is still busy performing its mission, thus would not be available for reassignment. After the loaded grain cart 14 has been unloaded at the dumping or discharge area, system 10 may update the state of the now empty grain cart 14 to Unbound and Idle, thereby making it available for reassignment. See FIG. 3.

If more grain from the combine 16 needs to be loaded, the operator 18 may then issue subsequent Follow and Dump commands 48. For example, upon issuance of a Follow command, the system 10 would assign another available grain cart 14 to the operator 18. The newly-assigned or bound grain cart 14 would then autonomously navigate to a suitable following position behind combine 16. Upon issuance of a Dump command, the grain cart 14 would then autonomously navigate to a suitable dumping position adjacent the combine 16 to receive additional grain discharged thereby.

In this regard it should be noted that in certain embodiments, the system 10 may be configured or programmed to permit more than one vehicle 12 to be assigned to a single operator 18 at any one time. In such an embodiment, a second grain cart 14 already may be following the combine 16 while the first grain cart 14 is receiving grain from the combine 16. That is, the first grain cart 14 would be executing the Dump command while the second grain cart 14 would be executing the Follow command. Then, once the operator 18 issues the Go Home command to the first (now loaded) grain cart 14, the operator 18 could then issue the Dump command to the second grain cart 14. The second grain cart 14 would then autonomously navigate to the dumping position, allowing it to receive additional quantities of grain from combine 16. Thereafter, the operator 18 could then issue another Follow command, in which case the system 10 would assign another grain cart 14 to the operator 18. This grain cart 14 would then autonomously move into the following position, ready to receive grain when needed. Alternatively, after a given grain cart 14 is fully loaded, the operator 18 could issue a Dump command directly, which would cause another grain cart 14 to move directly into the dumping position, bypassing the following position.

A significant advantage of the robotic vehicle control system 10 of the present invention is that it provides for the more effective and efficient control of a fleet of robots or robotic vehicles 12 compared with prior systems. For example, the system 10 may allow more than one robot or robotic vehicle 12 to be assigned or associated with a single operator 18 at a given time. Further, robots 12 may be unassigned or unbound from any operator, thereby forming a pool of available robots which may be tapped on demand by any system operator 18. Still further, the system 10 may automatically assign an available robot to an operator, freeing the operator of the mental and physical burden of manually tracking and evaluating the pool of available robots. Alternatively, the operator 18 could select a specific robot 12 for assignment.

Still yet another advantage of the robotic vehicle control system 10 is that the robots 12 may be truly autonomous, requiring no further command or intervention from a central command center once a command has been issued and the robot bound to an operator 18. The present invention thus allows operators to more fully focus on the missions to be performed by the robotic fleet without being distracted by the need to continually manage individual robots within the fleet.

Having briefly described one embodiment of the robotic vehicle control system 10, as well as some of its more significant features and advantages, various exemplary embodiments and variations of the robotic control system 10 will now be described in detail. However, before proceeding with the description it should be noted that while the robotic control system 10 is shown and described herein as is may be used to control vehicles in a grain harvesting operation, it is not limited to use in such particular application. Persons having ordinary skill in the art will readily recognize that the robotic control system 10 could be used in any of a wide range of applications and situations wherein it is necessary to control the operation of a plurality or fleet of robots or robotic vehicles. Consequently, the present invention should not be regarded as limited to the particular applications, vehicle types, and operational scenarios described herein.

Referring back now to FIG. 1, the robotic control system 10 is shown and described herein as it may be used in an agricultural application to control a fleet of robots or robotic vehicles 12. In this particular application, the fleet of robotic vehicles 12 comprises a plurality of grain carts 14 configured to receive grain discharged from one or more combines 16 working in a field. Of course, in other applications the robots 12 may comprise other types of vehicles, or may not even comprise 'vehicles' at all, comprising instead other types of robots or robotic systems. Moreover, there is no requirement for all of the robots 12 to comprise the same type of vehicle or robotic system. Other embodiments may comprise a wide range of robots and/or robotic vehicles configured to perform any of a wide variety of missions. Consequently, the present invention should not be regarded as limited to any particular type of robot or robotic vehicle 12.

The system 10 may comprise at least one autonomy module 20 that is operatively associated with combine 16. The autonomy module 20 may be programmed to implement, in whole or in part, various aspects of the invention, including method 32, as well as to provide certain other functions and operations that may be required or desired in a particular application. By way of example, in one embodiment, the autonomy module 20 may comprise a portion of, or be implemented by, software provided on a general purpose programmable computer (not shown). However, because such general purpose programmable computers are well known in the art and could be readily provided by persons having ordinary skill in the art after having become familiar with the teachings provided herein, the particular programmable computer system that may comprise the autonomy module 20, as well as the particulars of the various programs or processes that may be implemented by the autonomy module 20, will not be described in further detail herein.

The system 10 may also comprise an interface communications module 28. Interface communications module 28 may be operatively associated with the autonomy module 20 and may be configured to manage or organize communications and data transfer between the autonomy module 20 and the various robots 12 via the short- and long-range networks 22 and 24. The interface communications module 28 may also be operatively associated with the graphical user interface system or GUI 30 to allow the operator 18 to interact with the system 10.

In the particular embodiment shown and described herein, the interface communications module 20 may be operatively associated with one or more sensors 66 that may be operatively associated with the combine 16. By way of example, sensors 66 may comprise one or more position sensors, such as global positioning system (GPS) sensors, heading sensors, attitude sensors, etc., that will allow the autonomy module 20 to determine sufficient information about the kinematic state of the combine 16 to allow the robotic vehicles 12 (e.g., grain carts 14) to perform the required missions. Here again, however, since vehicle sensing systems of the type described herein are well-known in the art and could be readily provided by persons having ordinary skill in the art after having become familiar with the teachings provided herein, the particular sensors 66 that may be utilized in one embodiment of the present invention will not be described in further detail herein.

System 10 may also comprise a network management module 68. As will be described in greater detail below, network management module 68 may be operatively associated with the interface communications module 28 and may be configured to manage the communications occurring over the short- and long-range networks 22 and 24, thereby ensuring the efficient and reliable operation of the system 10.

The system 10 may also comprise a plurality or fleet of 'n' robots or robotic vehicles 12. In one embodiment, each of the n robots or robotic vehicles 12 may be substantially identical to the others, although there is no need for such identity. Each robotic vehicle 12 may be provided with an autonomy module 26 that is configured to control the operation of the robotic vehicle 12, thereby allowing it to perform certain missions or commands substantially autonomously, i.e., without input from an operator or supervisor. Each autonomy module 26 may be operatively associated with one or more vehicle sensors to allow the vehicle autonomy module 26 to sense those conditions or parameters required for the robot 12 to carry out its planned mission or missions.

In the particular embodiment shown and described herein, i.e., wherein each robotic vehicle 12 comprises a grain cart 14, the various vehicle sensors 70 may comprise one or more position sensors, heading sensors, attitude sensors, etc., that will allow the vehicle autonomy module 26 to determine sufficient information about the kinematic state of the grain cart 14 to allow it navigate alongside a moving combine 16 to receive grain harvested thereby as well as to perform other required missions. Each robotic vehicle 12 may also be provided with a communication module 72 to allow it to communicate with the other systems and devices (e.g., other robotic vehicles 12, and combine(s) 16) that may be connected to the short- and long-range networks 22 and 24.

As briefly mentioned above, the various autonomy modules 26 provided to the individual robots 12 may be substantially identical to the autonomy module 20 provided to the combine(s) 16, although they need not be. By way of example, in one embodiment, the various vehicle autonomy modules 26 may comprise a portion of, or be implemented by, software provided on a general purpose programmable computer (also not shown) of the type well-known in the art that may be operatively associated with each robotic vehicle 12. However, because such general purpose programmable computers could be readily provided by persons having ordinary skill in the art after having become familiar with the teachings provided herein, the particular programmable computer system that may comprise the vehicle autonomy modules 26, as well as the particulars of the various programs or processes that may be implemented by the vehicle autonomy modules 26 will not be described in further detail herein.

As briefly described above, the system 10 may also comprise a short-range communications network 22 and a long-range communications network 24. As will be explained in greater detail below, the short- and long-range communications networks 22 and 24 may be used to transfer various types of data and commands between the various elements of and devices of the system 10. In the particular embodiment shown and described herein, the system 10 will select or switch between the short- and long-range networks 22 and 24 depending on which network 22 or 24 is available and operative given the condition and/or location of the various robotic vehicles 12.

The short-range communications network 22 may comprise an ad-hoc wireless area network. As is known, such ad-hoc wireless networks permit direct communication between two devices on the network without the need for an access point intermediary. Such networks typically provide communications with high data rates with minimal latency compared with long-range networks. The short-range network 22 may comprise any of a wide variety of wireless area networks that are now known in the art or that may be developed in the future that are or would be suitable for the particular application. Consequently, the present invention should not be regarded as limited to any particular wireless area network type or configuration. However, by way of example, in one embodiment, the short-range network 22 may comprise a Wi-Fi network that conforms to the standards and protocols established by the WiFi Alliance.

As its name implies, the long-range communications network 24 may comprise a network suitable for communications over a longer range than is possible with short-range network 22. The long-range network 24 thereby permits communications between all of the various robotic vehicles, systems, and devices that may be associated with the system 10 regardless of whether such vehicles, systems, and devices are within the range of short-range network 22. Long-range network 24 may comprise any of a wide variety of long-range wireless area networks that are now known in the art or that may be developed in the future that are or would be suitable for the particular application. Consequently, the present invention should not be regarded as limited to any particular type or configuration of long-range network. However, by way of example, in one embodiment, the long-range network 24 may comprise a virtual private network (VPN) in which the various robotic vehicles 12, systems, and devices are connected to the long-range network 24 via cellular modems.

The system 10 may also comprise a central server 74. Central server 74 may be operatively connected to the long-range network 24 and may be programmed or configured (e.g., via suitable software or program code) to manage the long-range network 24. The central server 74 may also be provided with program code to allow it to perform other functions as well. For example, when a robotic vehicle 12 is first turned-on or activated, it will contact the central server 74 via the long-range network 24. Central server 74 will then assign an identity to the robotic vehicle 12, allowing it to be 'visible' to the other vehicles and devices on the system 10, i.e., via the short- and long-range networks 22 and 24, as the case may be. Central server 74 may perform a similar function with respect to participating operators 18. That is, the central server 74 may also assign identities to the various participating operators 18. Further, central server 74 may also maintain a catalog of the participating vehicles and operators during system operation. Here again, since central servers of the type suitable for use with the present invention are well-known in the art and could be readily provided by persons having ordinary skill in the art after having become familiar with the teachings provided herein, the particular central server 74 that may be utilized in one preferred embodiment of the present invention will not be described in further detail herein.

As mentioned, the system 10 permits the various robotic vehicles 12, systems, and devices comprising the system 10 to communicate with one another via both the short- and long-range communications networks 22 and 24. The short-range network 22 is capable of high data rates with minimal latency, although over a limited range. While the various vehicles, systems, and devices may also communicate with one another over the long-range network 24, such communications will typically involve lower data rates and higher latencies compared with the short-range network 22. The network management module 68 may be programmed or configured to switch between the short- and long-range networks 22 and 24 depending on which network 22, 24 is available and operative given the condition and location of the vehicles, systems, and devices comprising the system 10.

For example, when within range, the various vehicles, systems, and devices comprising the system 10 will communicate via the short-range network 22. Due to the high data rates and minimal latencies involved, such communications may involve various types of telemetry and position data to allow the vehicles to efficiently complete their assigned missions. In addition, commands may be transmitted over the short-range network 22 as well.

In the particular embodiment shown and described herein, the various vehicles, systems, and devices of system 10 are always connected to the long-range network 24. However, due to speed and/or latency issues, it may be necessary or desirable to limit the types of data that are transmitted over the long-range network 24. For example, the long-range network 24 will typically be used to transmit commands and vehicle states because the data involved are of limited size and short delays due to network latency may be tolerable. However, telemetry data are typically not transmitted via the long-range network 24 due to the relatively high latency involved. Also, in most network configurations, there is no need for highly accurate and timely telemetry data from vehicles not within range of the short-range network 22. Thus, as used in the present invention, the various capabilities and limitations of the short- and long-range networks 22 and 24 are complementary. Telemetry data are typically transmitted over the short-range network 22 because it is required in order for the robotic vehicles to accomplish their respective missions. Similarly, data that are not as time sensitive (e.g., command and/or dispatch data) may be transmitted via the long-range network 24.

The system 10 may also comprise one or more graphical user interfaces or GUIs 30 to allow one or more operators 18 to interface or interact with the system 10. For example, in the particular embodiment shown and described herein, each combine operator 18 may be provided with a GUI 30, such as a tablet computer, to allow the operator 18 to view the status of the various robotic vehicles 12 and also to issue commands to the various robotic vehicles 12.

With reference now to FIGS. 4(a-c), in one embodiment system 10 may cause a number of different types of control panels to be displayed on the GUI 30. A first control panel may comprise primary control panel 50, as briefly described above. A second control panel may comprise a fleet status panel 76. The GUI 30 may allow the operator 18 to reconfigure the display as necessary or desired to display the fleet status panel 76 and primary control panel 50 in any of a wide variety of configurations, as illustrated in FIGS. 4(a-c).

Primary control panel 50 may serve as the primary interface between the operator 18 and the system 10, thereby allowing the operator 18 to issue a variety of commands as well to as to check the status of a number of different systems. For example, and with reference now to FIGS. 5(a) and (b), one embodiment of a primary control panel 50 may be provided with a number of command icons to allow the operator 18 to issue various commands 48. A first set of commands 48 may comprise Binding commands 46 which cause the system 10 to assign or bind a robotic vehicle 12 to the operator 18. By way of example, Binding commands 46 may comprise a Follow command 48 and a Dump command 48. A second set of commands 48 may comprise Unbinding commands 52 which, when activated, will result in the release or unbinding of the robotic vehicle 12 and operator 18. Exemplary Unbinding commands 52 may comprise a Halt command 48 and a Go Home command 48.

Primary control panel 50 may also be provided with other icons or display features to allow the operator 18 to interact with the system 10. For example, primary control panel 50 may be provided with a "Check Status" icon 78 to allow the operator to check the status of the robotic vehicle 12 or some other device or element of system 10. Primary control panel 50 may also be provided with a "View Camera" icon 80 which, when activated, may cause a video image taken by a video camera associated with the robotic vehicle 12 to appear in a camera display window 82. Primary control panel 50 may also be provided with an Operator icon 84 to provide an indication of the identity of the particular operator involved.

If desired, the system 10 may operate GUI 30 to grey-out or otherwise modify certain display features to reflect the particular operational mode of the system 10 or the status of the robotic vehicles 12. For example, the primary control panel 50 illustrated in FIG. 5(a) may have the Halt and Go Home Unbinding commands 52 greyed-out or deactivated if the robotic vehicle has yet to be assigned or bound to the operator. That is, because the Halt and Go Home commands are Unbinding commands 52, they would have no effect because no particular robotic vehicle 12 is currently bound to the particular operator 18. However, the Binding commands 46 of Follow and Dump may be displayed as active, as the selection of either command would result in the assignment or binding of a robotic vehicle 12 to the operator 18. If no robots are available to execute a Follow or Dump command 48 then those commands still would be greyed-out.

Figure 5B:
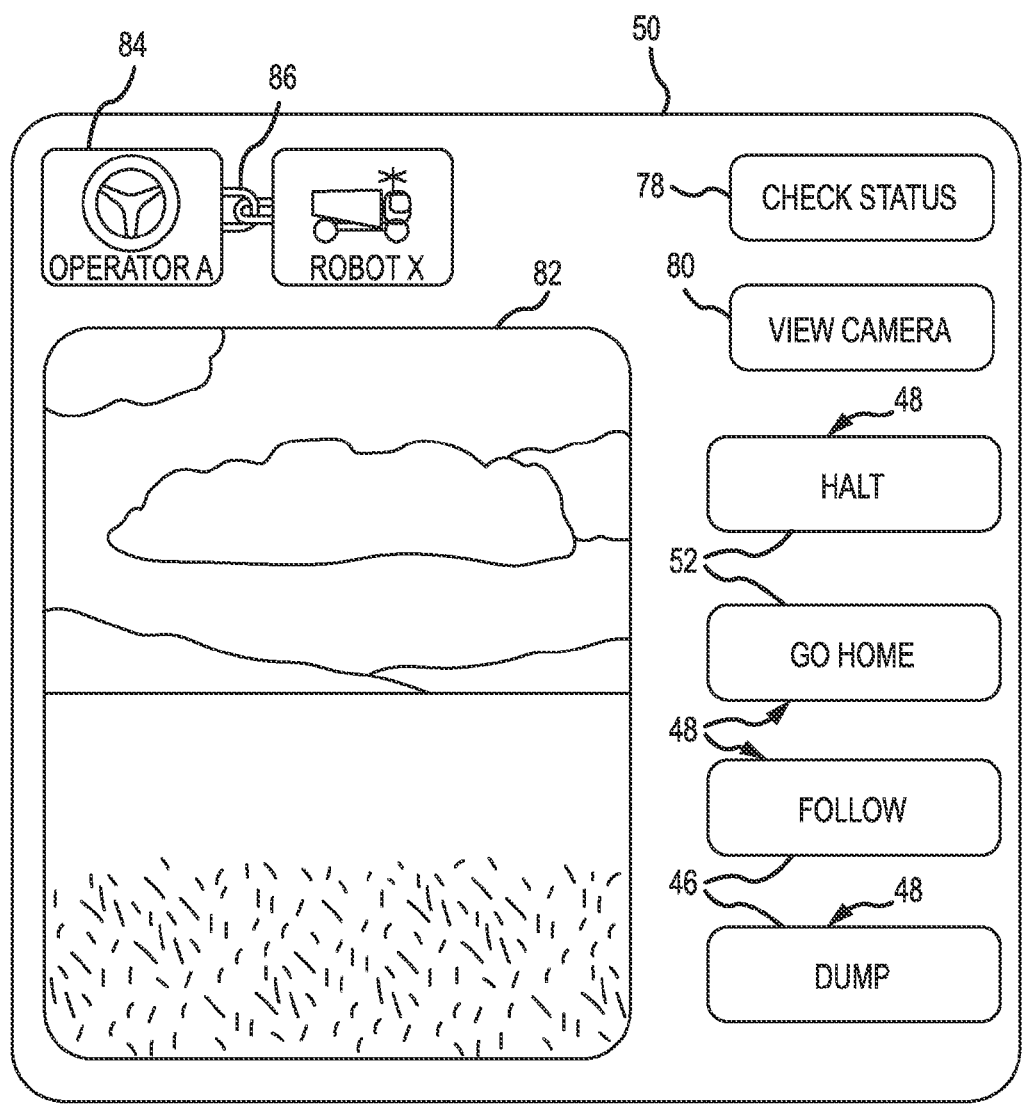

An operational mode wherein at least one robotic vehicle 12 is assigned or bound to the operator 18 may result in the display of a slightly different primary control panel 50. For example, and with reference now to FIG. 5(b), control panel 50 may indicate that a certain robotic vehicle 12 ("Robot X") is bound to the operator 18 ("Operator A") by means of a binding icon 86. Because the robotic vehicle 12 is bound to the operator 18, primary control panel 50 may be displayed with all of the command icons 48 designated as active (i.e., not greyed-out). That is, the command icons correlate with the particular state of the robotic vehicle. The Check Status and View Camera icons 78 and 80 also may be displayed as active, because they are available commands in that particular operational state as well. A video image from a video camera provided on the bound robotic vehicle 12 also may be shown in the camera display window 82.

Figure 6:
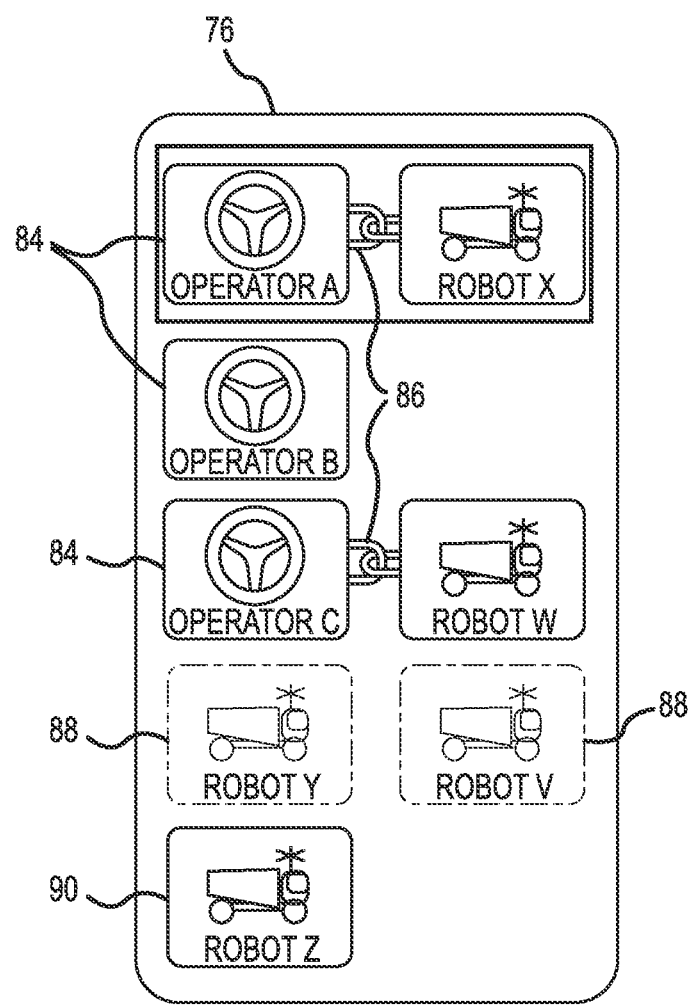
FIG. 6 is a pictorial representation of a fleet status panel.

Referring now to FIG. 6, the GUI 30 may also display a fleet status panel 76 for the operator 18. Fleet status panel 76 may be provided with a number of icons to allow the operator to readily ascertain the status of the various robotic vehicles 12 comprising the fleet, as well as any other operators that may be using the system 10. For example, various operators may be indicated by a like number of operator icons 84. Unavailable or Busy robotic vehicles 12 may be indicated by means of robot unavailable icons 88, whereas robotic vehicles 12 that are available for assignment may be indicated by means of robot available icons 90. The unavailable robot icons 88 may be greyed out if desired, to indicate those robotic vehicles 12 that are unavailable to the particular operator viewing the fleet status panel 76. Fleet status panel 76 may also indicate which operators 18 are bound to which robotic vehicles 12 by displaying binding icons 86 where appropriate.

For example, in the particular operational scenario illustrated in FIG. 6, "Robot X" is bound to "Operator A" and "Robot W" is bound to "Operator C." No robotic vehicle 12 is bound to "Operator B." "Robot Y" and "Robot V" are busy or unavailable, whereas "Robot Z" is available.

In the particular embodiment shown and described herein, activation of one of the robot icons 88, 90 on the fleet status panel 76 will result in the display of a secondary control panel 92 for the selected robot. For example, and with reference now to FIG. 7(*a*), the selection of the robot available icon 90 for Robot Z results in the display of a secondary control panel 92 for Robot Z. Because Robot Z is available (i.e., its state is Unbound and Idle) and because Operator A is not bound to a robotic vehicle 12, all of the command icons 48 for Robot Z are available, thus not greyed out. However, if Operator A were bound to a robotic vehicle 12, say Robot X, then the selection of the Robot Z icon would result in the display of a secondary control panel 92 having the Binding commands 46 (e.g., Follow and Dump) unavailable or greyed out because, in this particular embodiment, the system 10 will not allow Robot Z to displace the binding of Robot X. That is, in this embodiment, the system 10 is configured to prevent more than one robotic vehicle 12 from being assigned to a single operator at the same time.

However, it should be noted that other embodiments of the system 10 may be configured to permit the assignment of multiple robotic vehicles to a single operator at the same time, as described earlier. Such embodiments may utilize multiple primary control panels 50, one for each bound robot. They may also utilize an extra primary control panel 50 as well, to invoke auto-binding of a new robot from an available pool, again as described earlier.

Figure 7A:
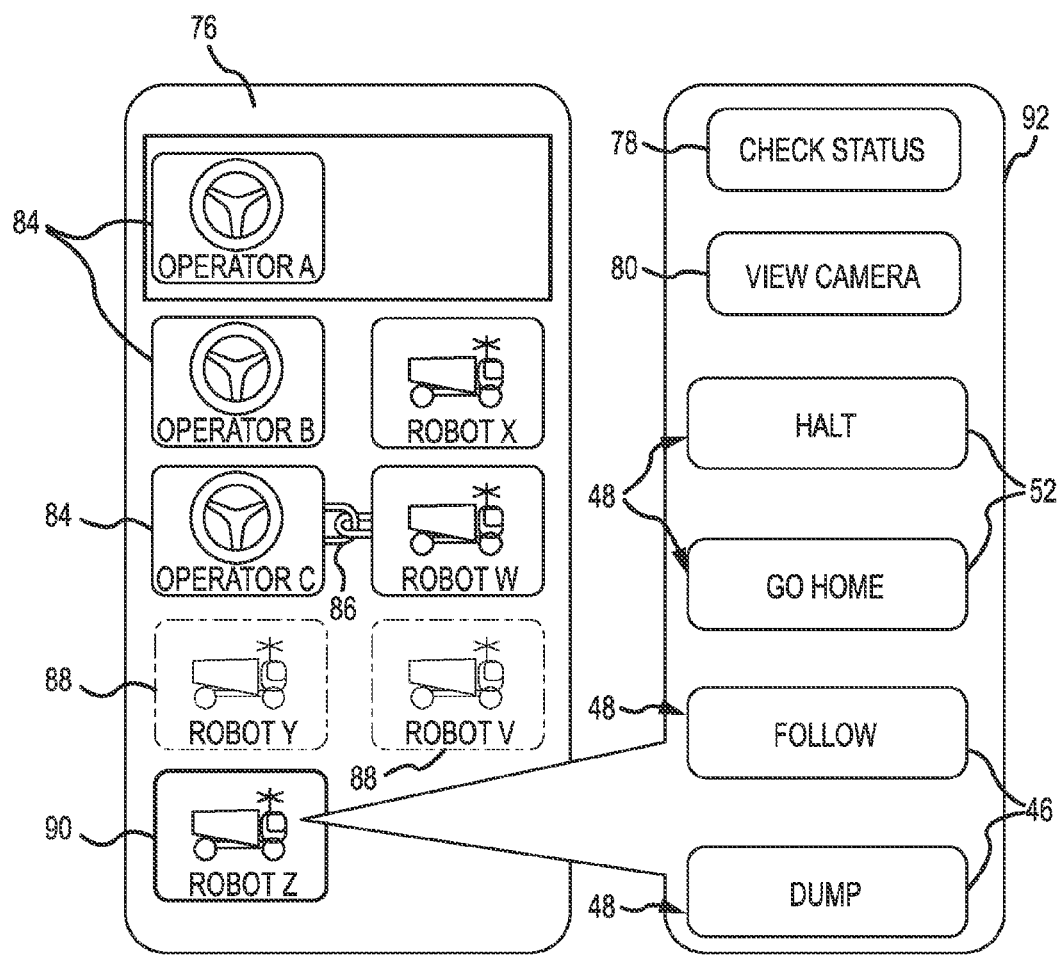
FIG. 7(*a*) is a pictorial representation of a secondary control panel for an unbound operator and an available robotic vehicle.
Figure 7B:
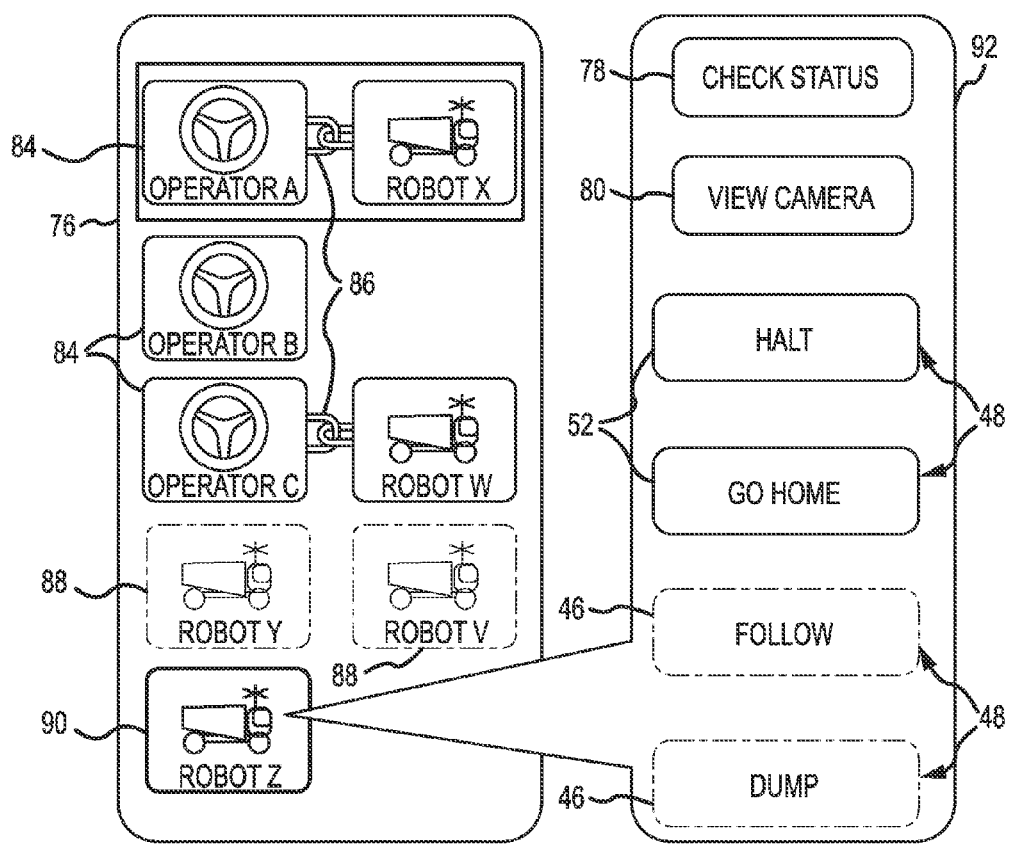
Figure 7C:
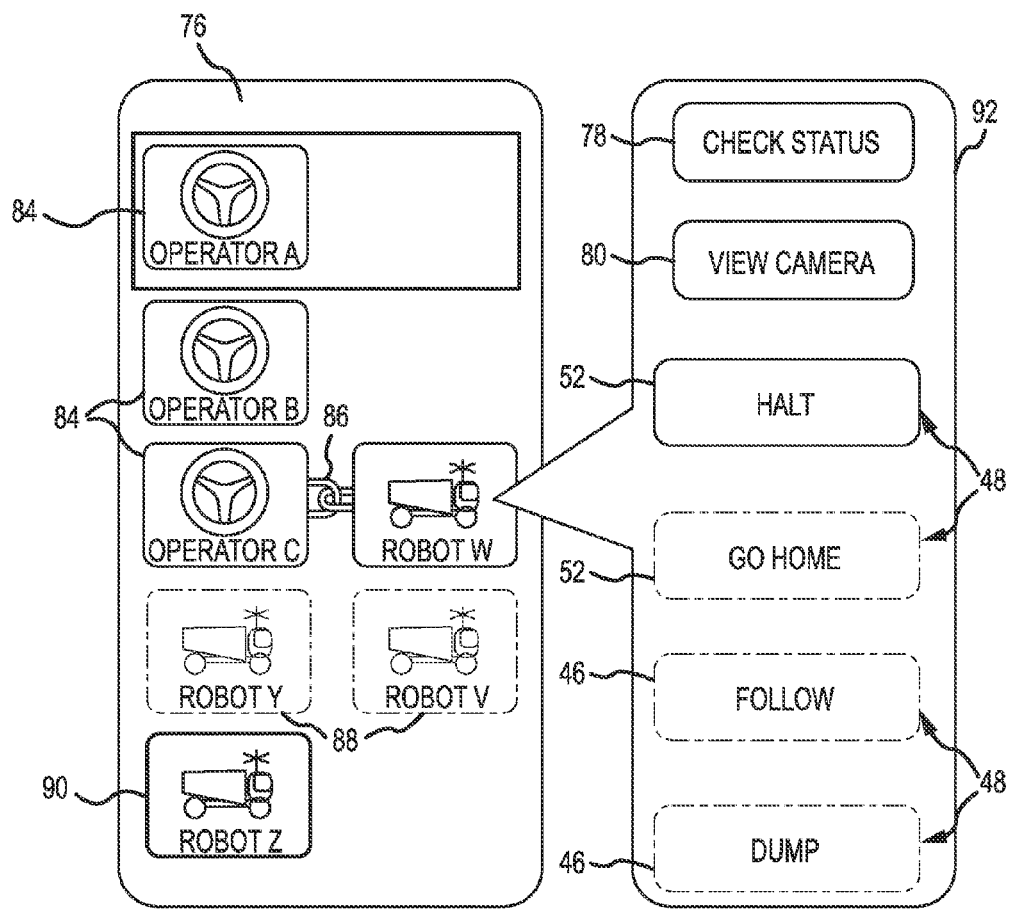

Finally, in the secondary control panel 92 illustrated in FIG. 7(*c*), the system 10 has disabled or greyed-out all commands 48 for Robot W that would allow Operator A to interfere with the workflow of Operator C, which is bound to Robot W. If desired, the system 10 may be configured or programmed so that the Halt Unbinding command 52 is still available. The availability of the Halt Unbinding command 52 would serve as an override mechanism to break the binding of Robot W to Operator C, thereby allowing Operator A to take control of Robot W. Of course, such an override command need not be provided, or may be limited only to certain operators, as may be desired or required in any particular embodiment or application.

Referring back now to FIG. 2, the system 10 may be configured to operate in accordance with a method 32 to control the various robotic vehicles 12 and allow them to be directed by one or more of the operators 18. A first step 34 of method 32 involves determining the state of the various robotic vehicles 12 comprising the fleet.

In the particular embodiment shown and described herein, each robotic vehicle 12 may be in at least one of a Bound state 36, an Unbound state 38, a Busy state 40, and an Idle state 42. See FIG. 3. A robotic vehicle 12 is in a Bound state 36 if it is currently assigned to an operator 18 and is in an Unbound state 38 if it is not currently assigned to an operator 18. A robotic vehicle 12 is in a Busy state 40 if it is currently performing a mission or command and is in an Idle state if the mission or command has been completed. Robotic vehicles 12 that are in the Unbound and Idle states 38 and 42 are available for assignment or binding with operators 18. See FIG. 3. Robotic vehicles 12 that are in other states are not available for assignment.

Method 32 may also involve a step 35 of offering suitable commands 48 to an operator 18 based on the state of the robotic vehicles 12. The commands 48 may be displayed on a primary control panel 50 which may be displayed on GUI 30. See, for example, FIGS. 5(*a*) and (*b*). For available robotic vehicles 12 (i.e., that are in the Unbound and Idle states 38 and 42), the suitable or available commands 48 may comprise the Halt, Go Home, Follow, and Dump commands 48.

The next step 44 of method 32 may involve determining whether a Binding command 46 has been requested by the operator 18 and received by the system 10. A Binding command 46 may be requested by an operator 18 by activating an appropriate command icon 48 presented on a primary control panel 50. In the particular embodiment shown and described herein, Binding commands 46 are the Follow and Dump commands 48. Commands 48 may also comprise Unbinding commands 52, which may comprise the Halt and Go Home commands 48.

If no Binding command 46 has been issued or requested by the operator (i.e., at step 44), method 32 continues to update the state of the various robotic vehicles 12, i.e., by repeating step 34. If a Binding command 46 (e.g., a Follow or Dump command) has been issued by the operator 18, then method 32 proceeds to step 54 to determine whether a robotic vehicle 12 is currently assigned or bound to the operator 18 that issued the command 46. If no robotic vehicle 12 is currently assigned or bound to the requesting operator 18, the method 21 will assign a robotic vehicle 12 to the requesting operator 18 at step 56. For example, the method 32 will assign an available robotic vehicle 12 to the requesting operator 18. Optionally, the method 32 may assign a robotic vehicle 12 of status Available that is in a position or location such that it may perform the requested mission as rapidly or as efficiently as possible.

If a robotic vehicle 12 is already bound to the requesting operator 18, i.e., as determined at step 54, then method 32 may proceed to step 58 to determine whether the bound vehicle 12 is suitable for the requested command. If for some reason the bound vehicle 12 is not suitable for performing the requested command, then method 32 may proceed to step 56 and assign to the requesting operator 18 a new vehicle 12. If so, the method 32 may unbind from the requesting operator 18 the unsuitable vehicle 12, although this is not required.

Method 32 may then proceed to step 60 and allow the operator 18 to command the assigned or bound vehicle 12. The system 10 will allow the assigned operator 18 to continue to issue commands to the assigned or bound vehicle 12 until such time as it receives an Unbinding command 52 at step 62. During this time, the method 32 will continue to allow the operator 18 to assign additional commands to the bound vehicle 12. Once an Unbinding command 52 is received, e.g., when the operator 18 selects either the Halt or Go Home command icons 48, method 32 will then release the vehicle 12 at step 64.

Referring now primarily to FIGS. 2 and 5, the system 10 may be operated as follows to allow one or more combine operators 18 to control a fleet of grain carts 14 (e.g., robotic vehicles 12) in a grain harvesting operation. In an initial condition wherein no robotic vehicle 12 (e.g., a grain cart 14) is bound to a particular combine operator 18 (e.g., Operator A), a combine operator 18 may select the Follow command icon 48 on the primary control panel 50. See FIG. 5(*a*). Upon receiving the Follow command, which is a Binding command 46, the system 10 will automatically assign or bind to the operator 18 a grain cart 14 (e.g., Robot X) at step 56. Thereafter, the assigned or bound vehicle will autonomously move into the appropriate position (e.g., a following position) adjacent the combine 16. The assigned or bound grain cart 14 will continue to perform this following mission until it receives another command 48. Alternatively, in another embodiment, the operator 18 could issue the Follow command to a specific robotic vehicle 12, which would then be bound to the operator 18.

When the operator 18 is ready for the grain cart 14 to receive grain discharged by the combine 16, the operator 18 may issue a Dump command 48 by selecting the "Dump" icon on the primary control panel 50. The issuance of the Dump command 48 will cause the grain cart 14 to autonomously move to a position relative to the combine 16 that will allow the grain cart 14 to receive grain discharged by the combine 16. The grain cart 14 will continue to perform this dumping mission until it receives another command.

When the grain cart 14 is fully loaded (or when the operator 18 has decided on a different mission), the operator 18 may use the GUI 30 to issue a Go Home command 48. The loaded grain cart 14 will then navigate to the dumping or discharge area. Again, the loaded grain cart 14 may perform this mission substantially autonomously. Further, because the Go Home command is an Unbinding command 52, the grain cart 14 will become unbound from the operator 18. The system 10 may then update the state of the loaded grain cart 14 to Unbound and Busy. That is, while the loaded grain cart 14 has been released from the particular operator 18, it is still performing its mission, thus not available for reassignment. After the loaded grain cart 14 has been unloaded at the dumping or discharge area, the system 10 may update the state of the (now empty) grain cart 14 to Unbound and Idle, thereby making it available for reassignment.

In some embodiments, the system 10 may be programmed or configured to maintain the association between an Unbound but Busy robot 12 and its former operator. In such an embodiment, the Unbound robot 12 may continue to send its status updates and alerts to that operator. Further, other operators may further be notified that, even though the robot is not bound, it is still performing a mission on behalf of the former operator.

If more grain from the combine 16 needs to be loaded, the operator 18 may then issue subsequent Follow and/or Dump commands 48 so that another grain cart 14 may move into position to receive grain from the combine 16. For example, upon issuance of a Follow command, the system 10 would assign another available grain cart 14 to the operator 18. The newly-assigned grain cart 14 would then autonomously navigate to a suitable following position behind combine 16. The operator could then issue a Dump command, in which case the newly-assigned grain cart 14 would autonomously navigate to a suitable dumping position to receive additional grain discharged by combine 16.

Alternatively, the operator could issue a Dump command immediately after releasing the loaded grain cart 14. The system 10 would assign another available grain cart 14 (e.g., from a pool of available grain carts 14). This newly-assigned grain cart 14 would then autonomously navigate directly to the dump position (i.e., without first following the combine 16).

In an embodiment that is configured or programmed to permit more than one vehicle 12 to be assigned to a single operator 18 simultaneously, a second grain cart 14 already may be following the combine 16 (i.e., while the first grain cart 14 is receiving grain from the combine 16). The first grain cart 14 would be executing the Dump command while the second grain cart 14 would be executing the Follow command. Then, after the operator 18 issues the Go Home command to the first, now loaded, grain cart 14, the operator 18 could then issue the Dump command to the second grain cart 14. The second grain cart 14 would then autonomously navigate to the dumping position, allowing it to receive additional quantities of grain from combine 16. Thereafter, the operator 18 could then issue another Follow command, in which case the system 10 would assign a third grain cart 14 to the operator 18 (by this time the first grain cart 14 would have been unbound from the operator 18, i.e., upon the execution of the Go Home command). The third grain cart 14 would then autonomously move into the following position, ready to receive grain when needed.

Having herein set forth preferred embodiments of the present invention, it is anticipated that suitable modifications can be made thereto which will nonetheless remain within the scope of the invention. The invention shall therefore only be construed in accordance with the following claims:

What is claimed is:

1. A method of controlling a plurality of robotic vehicles, comprising:
   determining, by a processor, a state of each of the plurality of robotic vehicles;
   assigning a robotic vehicle to an operator in response to a Binding command from the operator, the operator being a human operator of a machine, and changing the state of the assigned robotic vehicle to bound;
   allowing the operator to command the assigned robotic vehicle to perform a mission with respect to the machine; and
   releasing the assigned robotic vehicle in response to an Unbinding command from the operator.

2. The method of claim 1, wherein each robotic vehicle may be in at least one of a bound state, an unbound state, a busy state, and an idle state, and wherein said assigning the robotic vehicle comprises assigning a robotic vehicle to the operator that is in both an unbound state and an idle state.

3. The method of claim 2, wherein said releasing the assigned robotic vehicle comprises changing the state of the released robotic vehicle to unbound.

4. The method of claim 1, wherein said assigning the robotic vehicle further comprises:
   receiving a request from the operator for a specific robotic vehicle; and
   assigning the specific robotic vehicle to the operator.

5. The method of claim 1, wherein said assigning the robotic vehicle further comprises automatically assigning a robotic vehicle to the operator.

6. The method of claim 5, wherein said assigning the robotic vehicle further comprises:
   selecting a robotic vehicle to be assigned based on predetermined selection criteria associated with the Binding command received from the operator.

7. The method of claim 1, further comprising:
   assigning a second robotic vehicle to the operator in response to a second Binding command received from the operator; and
   allowing the operator to command the second robotic vehicle to perform a second mission.

8. The method of claim 1, wherein said assigning the robotic vehicle further comprises assigning a second robotic vehicle to a second operator in response to a Binding command from the second operator.

9. The method of claim 1, further comprising displaying Binding and Unbinding commands on a primary control panel.

10. The method of claim 1, further comprising displaying at least one state of the robotic vehicles on a fleet status panel.

11. The method of claim 10, further comprising displaying additional information about a selected robotic vehicle on a secondary control panel associated with the fleet status panel.

12. The method of claim 11, wherein displaying additional information about a selected robotic vehicle further comprises displaying Binding and Unbinding commands on the secondary control panel.

13. The method of claim 1, wherein at least portions of said determining, said assigning, and said releasing steps are performed over a network.

14. A system for controlling a plurality of robotic vehicles, comprising:
- at least one position sensor operatively associated with a mobile work machine, the at least one position sensor being configured to sense a geographic position of the mobile work machine;
- an autonomy module operatively associated with the mobile work machine and the sensor, the autonomy module being configured to determine a state of the mobile work machine;
- an interface communication module operatively associated with said autonomy module and said position sensor;
- a graphical user interface operatively associated with said interface communication module;
- a short range network operatively associated with said interface communication module and at least one of the plurality of robotic vehicles;
- a long range network operatively associated with said interface communication module and with each of the plurality of robotic vehicles; and
- a central server operatively associated with said long range network, said central server comprising program code to assign identities to the mobile work machine and the robotic vehicles and to maintain a catalog of said identities during operation of said system.

15. The system of claim 14, further comprising a network management module, said network management module being configured to operate said interface communication module to transmit command data to the robotic vehicles via the short range network, said command data being based on the state of the mobile work machine, and wherein the robotic vehicles are configured to respond to the command data and transmit state information and telemetry data to said autonomy module via the short range network.

16. The system of claim 15, wherein said network management module is configured to operate said interface communication module to transmit command data to the robotic vehicles via the long range network and wherein the robotic vehicles are configured to transmit state information only to said autonomy module via the long range network.

17. The system of claim 14, wherein said short range network comprises an ad-hoc wireless network.

18. The system of claim 14, wherein said long range network comprises a virtual private network.

19. A control system for coordinating a work machine and a plurality of robotic vehicles, comprising:
- a work machine control system, comprising:
    - at least one work machine position sensor;
    - a work machine autonomy module, the work machine autonomy module comprising an interface communication module and a network management module, the work machine autonomy module being operatively associated with the work machine position sensor and the network management module being operatively associated with the interface communication module; and
    - a graphical user interface operatively associated with the interface communication module, the graphical user interface comprising a control panel and a fleet status panel, the control panel being configured to allow an operator of the work machine to issue commands to the control system and the fleet status panel being configured to display a status of the plurality of robotic vehicles;
- a communications network, comprising:
    - a short range network operatively associated with the robotic vehicles and the interface communication module, the short-range network being configured to transmit at least telemetry data;
    - a central server; and
    - a long range network operatively associated with the central server, the robotic vehicles and the interface communication module, the long-range network being configured to communicate command data; and
- a robotic vehicle control system for the plurality of robotic vehicles, comprising:
    - a robotic vehicle sensor;
    - a robotic vehicle autonomy module operatively associated with the robotic vehicle sensor; and
    - robotic vehicle communications module operatively associated with the short-range communications network and long-range communications network, the robotic vehicle communications module being configured to permit communications directly between robotic vehicles.

20. The control system of claim 19, wherein the network management module is configured to switch between the short range network and the long range network.

* * * * *